United States Patent
Hasegawa

(10) Patent No.: US 12,556,803 B2
(45) Date of Patent: Feb. 17, 2026

(54) IMAGE PICKUP APPARATUS, CONTROL APPARATUS, CONTROL METHOD, AND STORAGE MEDIUM

(71) Applicant: CANON KABUSHIKI KAISHA, Tokyo (JP)

(72) Inventor: Reiji Hasegawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 18/630,497

(22) Filed: Apr. 9, 2024

(65) Prior Publication Data
US 2024/0422421 A1 Dec. 19, 2024

(30) Foreign Application Priority Data
Jun. 15, 2023 (JP) .................. 2023-098239

(51) Int. Cl.
*H04N 23/62* (2023.01)
*G06F 3/01* (2006.01)
*H04N 23/611* (2023.01)

(52) U.S. Cl.
CPC ............ *H04N 23/62* (2023.01); *G06F 3/016* (2013.01); *H04N 23/611* (2023.01)

(58) Field of Classification Search
CPC ....... H04N 23/62; H04N 23/611; G06F 3/016
USPC ..................................... 348/222.1
See application file for complete search history.

(56) References Cited

U.S. PATENT DOCUMENTS

| | | | |
|---|---|---|---|
| 9,667,870 B2 * | 5/2017 | Cheong | H04N 23/64 |
| 10,198,075 B2 * | 2/2019 | Sato | G06F 3/041 |
| 11,442,340 B2 * | 9/2022 | Noda | H04N 23/54 |
| 11,687,158 B2 * | 6/2023 | Seo | H04N 23/73 340/407.1 |
| 2012/0044401 A1 * | 2/2012 | Parviainen | G06F 3/0304 348/333.03 |
| 2012/0050324 A1 * | 3/2012 | Jeong | G06F 16/9537 348/61 |
| 2014/0104453 A1 * | 4/2014 | Fujinawa | H04N 23/80 348/222.1 |
| 2017/0255267 A1 * | 9/2017 | Sato | G06F 3/016 |
| 2018/0109724 A1 * | 4/2018 | Kang | H04N 21/47205 |
| 2021/0018820 A1 * | 1/2021 | Noda | G06F 3/016 |

FOREIGN PATENT DOCUMENTS

JP 2021027368 A 2/2021

\* cited by examiner

*Primary Examiner* — Pritham D Prabhakher
(74) *Attorney, Agent, or Firm* — Cowan, Liebowitz & Latman, P.C.

(57) ABSTRACT

An image pickup apparatus configured to generate image data by imaging includes a vibrator configured to generate vibration recognizable by a user, and a processor configured to detect a specific object in the image data, select the specific object as a target for processing relating to the imaging and control the vibrator according to a detection result.

16 Claims, 5 Drawing Sheets

IMAGE PICKUP APPARATUS, CONTROL APPARATUS, CONTROL METHOD, AND STORAGE MEDIUM

BACKGROUND

Technical Field

One of the aspects of the embodiments relates to an image pickup apparatus having an object detecting function.

Description of Related Art

Some image pickup apparatuses, such as digital cameras, detect a specific person (face), select it as a main object to be imaged, and perform auto-exposure (AE), autofocus (AF), etc. for the main object. The conventional image pickup apparatus overlays a frame enclosing the detected main object on the image on the rear monitor or electronic viewfinder (EVF) to inform the user that the main object has been selected, and prompt the user viewing this display to operate a release button to perform imaging.

However, due to the small display size of the rear monitor and EVF on an image pickup apparatus, the user has difficulty in keeping staring at the frame overlaid there or immediately performing an imaging instruction operation according to a frame position change, etc.

Japanese Patent Laid-Open No. 2021-27368 discloses a camera system that notifies a user of the in-focus direction and in-focus state in AF using vibrations generated by a vibration motor.

Japanese Patent Laid-Open No. 2021-27368 does not disclose notification regarding object detection using vibration.

SUMMARY

An image pickup apparatus according to one aspect of the disclosure is configured to generate image data by imaging and includes a vibrator configured to generate vibration recognizable by a user, and a processor configured to detect a specific object in the image data, select the specific object as a target for processing relating to the imaging, and control the vibrator according to a detection result. A control method and apparatus corresponding to the above image pickup apparatus also constitute another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

First Embodiment

In the first embodiment, the camera 20 as an image pickup apparatus supports imaging by detecting and tracking specific movements (behaviors) of a person.

Figure 1:
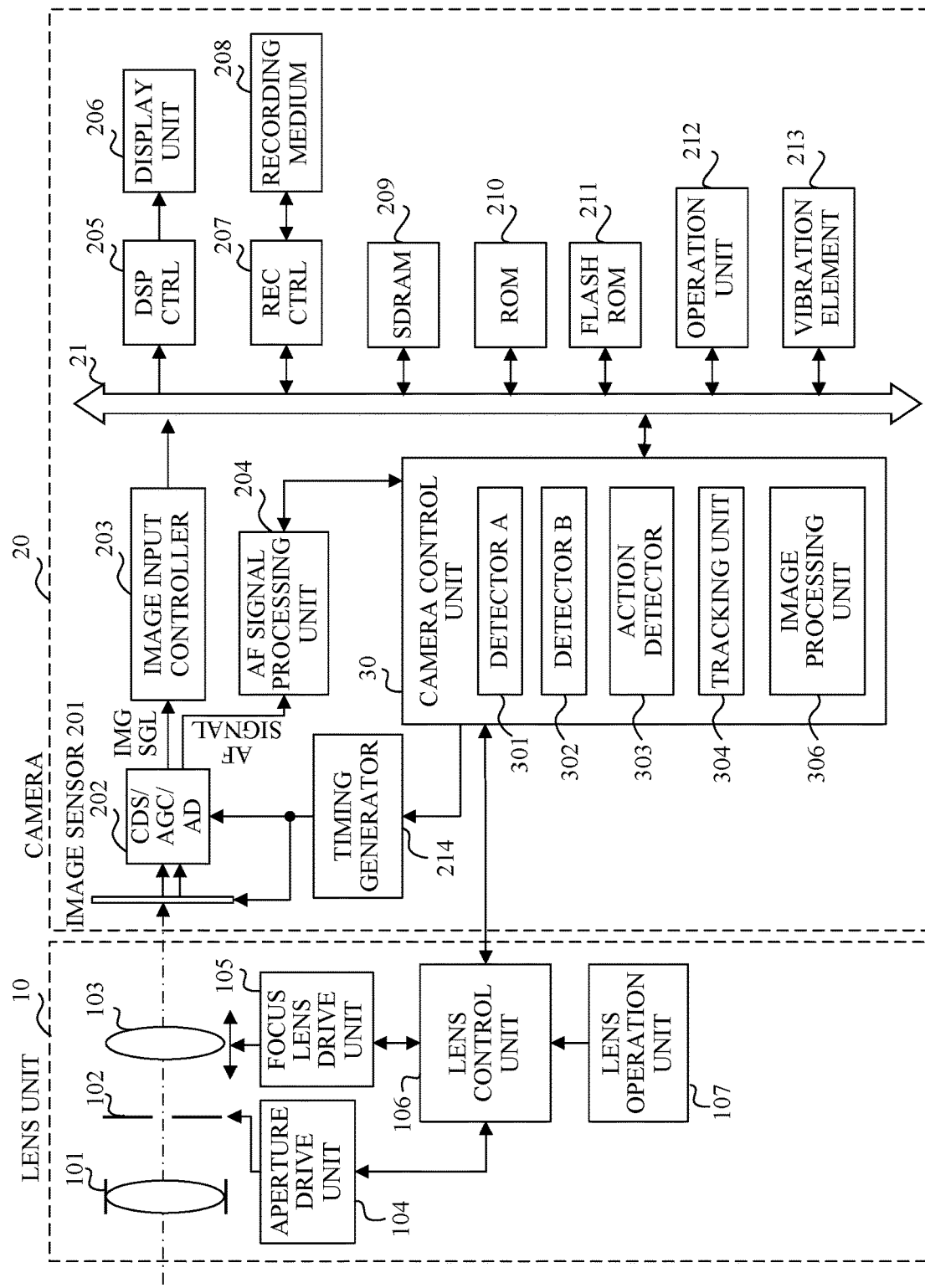
FIG. 1 is a block diagram illustrating the configuration of a lens interchangeable type camera system according to a first embodiment.

FIG. 1 illustrates the configuration of a lens interchangeable type camera system including the camera 20. The camera system includes the camera 20 and a lens unit (lens apparatus) 10 attachable to and detachable from the camera 20. The lens unit 10 includes a lens control unit 106 that controls the operation of the entire lens unit 10, and the camera 20 includes a camera control unit 30 that controls the operation of the entire camera system. The camera control unit 30 and the lens control unit 106 can communicate with each other through a terminal provided on an unillustrated mount.

In the lens unit 10, an imaging optical system includes a fixed lens 101, an aperture stop (diaphragm) 102, and a focus lens 103. The aperture stop 102 is driven by an aperture drive unit 104 to change its aperture diameter, and controls a light amount incident on an image sensor 201, which will be described below. The focus lens 103 is driven by a focus lens drive unit 105 so as to change its position in the optical axis direction, and performs focusing of the imaging optical system. The aperture drive unit 104 and focus lens drive unit 105 are controlled by a lens control unit 106.

The lens operation unit 107 is a group of input devices for the user to make settings regarding the operation of the lens unit 10. Through operations, the lens operation unit 107 can switch between autofocus (AF) and manual focus (MF), adjust the position of the focus lens in MF, set a moving range of the focus lens, and set an image stabilizing mode. The lens control unit 106 performs control and processing according to these settings.

The lens control unit 106 controls the aperture drive unit 104 and the focus lens drive unit 105 according to control commands and control information received from the camera control unit 30, and sends the lens information indicating the state of the imaging optical system to the camera control unit 30.

In this embodiment, the camera 20 is of a lens interchangeable type, but the image pickup apparatus may be a lens integrated type camera.

In the camera 20, an image sensor 201 includes a CCD sensor or a CMOS sensor, and photoelectrically converts (captures) an object image formed by the imaging optical system in the lens unit 10. The image sensor 201 has a plurality of pixels arranged in a two-dimensional array, and each pixel accumulates charges according to the light amount received by the photodiode. The charges accumulated in each photodiode are read out as an imaging signal (IMG SGL) at the timing of a drive pulse output from a timing generator 214 according to a command from the camera control unit 30. At this time, an AF signal as a signal used for AF is also read out in addition to the imaging signal.

A CDS/AGC/AD converter (simply referred to as the converter 202 hereinafter) performs correlated double sampling, gain control, and A/D conversion to remove reset noise for the imaging signal and AF signal read out of the image sensor 201 to generate image data and AF data. The converter 202 outputs the image data and AF data to an image input controller 203 and an AF signal processing unit 204, respectively.

The image input controller 203 stores the image data output from the converter 202 in an SDRAM 209 via a bus 21. The image data stored in the SDRAM 209 is read out by a display control unit (DSP CTRL) 205 via the bus 21 and displayed on the display unit 206. In an image recording mode for recording image data, the image data stored in the SDRAM 209 is recorded by a recording medium control unit (REC CTRL) 207 on a recording medium 208 such as a semiconductor memory.

The ROM 210 stores programs to be executed by the camera control unit 30 and various data necessary for executing the programs. The flash ROM 211 stores various setting information regarding the operation of the camera 20 set by the user.

Within the camera control unit 30, a detector A301 detects an object such as a person in the image data input from the image input controller 203, and acquires and stores its coordinates and feature amounts. The method for detecting an object can use a known method using a neural network or a machine learning model.

A detector B302 detects an object different from the object detected by the detector A301 in the image data input from the image input controller 203, and acquires and stores its coordinates and feature amounts. The method of detecting another object is the same as that of the detector A.

The action (or behavior) detector 303 detects a specific action of a person in the image data input from the image input controller 203, and acquires and stores the coordinates and feature amounts of the person. The method of detecting the specific action can also use the known method using a neural network or a machine learning model. The detector A301, the detector B302, and the action detector 303 constitute a detector.

A tracking unit 304 as a selector selects a specific object as a target to be tracked (target of processing relating to imaging) and stores its coordinates, or extracts and stores the feature amount of that object, and detects the same object, updates its feature amount, and outputs its coordinates. By repeating this processing using continuous image data (frame images), the specific object can be tracked. A known method can be used to extract the feature amount and detect the same object using the feature amount.

The image processing unit 306 performs predetermined image processing for the image data stored in the SDRAM 209. The predetermined image processing includes development processing such as auto-white balance adjustment processing (AWB), color interpolation (demosaic) processing, and gamma correction processing, signal format conversion processing, scaling processing, and the like.

The camera control unit 30 serving a control unit controls each component in the camera 20 while communicating information with each component. The camera control unit 30 also controls power on and off, turning on and off live-view display, imaging operation, AF operation, playback operation of a recorded image, and changes of various settings according to input from the operation unit 212 based on user operations. The operation unit 212 includes a power button for instructing power on and off, a live-view button for instructing turning on and off of live-view display, a release button for instructing AF operation and imaging operation, and the like.

The camera control unit 30 transmits a control command and information about the camera 20 to the lens unit 10 (lens control unit 106), and receives lens information from the lens control unit 106. The camera control unit 30 includes a microcomputer, and controls the entire camera system by executing a program stored in the ROM 210.

The camera 20 includes a vibration element 213. The vibration element 213 includes a piezoelectric element, a vibration (eccentric) motor, a linear actuator, and the like, and causes an operation member such as a release button to generate vibration recognizable by the user. This vibration can provide the user with a notification. The camera control unit 30 controls the vibration element 213 according to the detection results by the detector A301, the detector B302, and the action detector 303.

Figure 2:
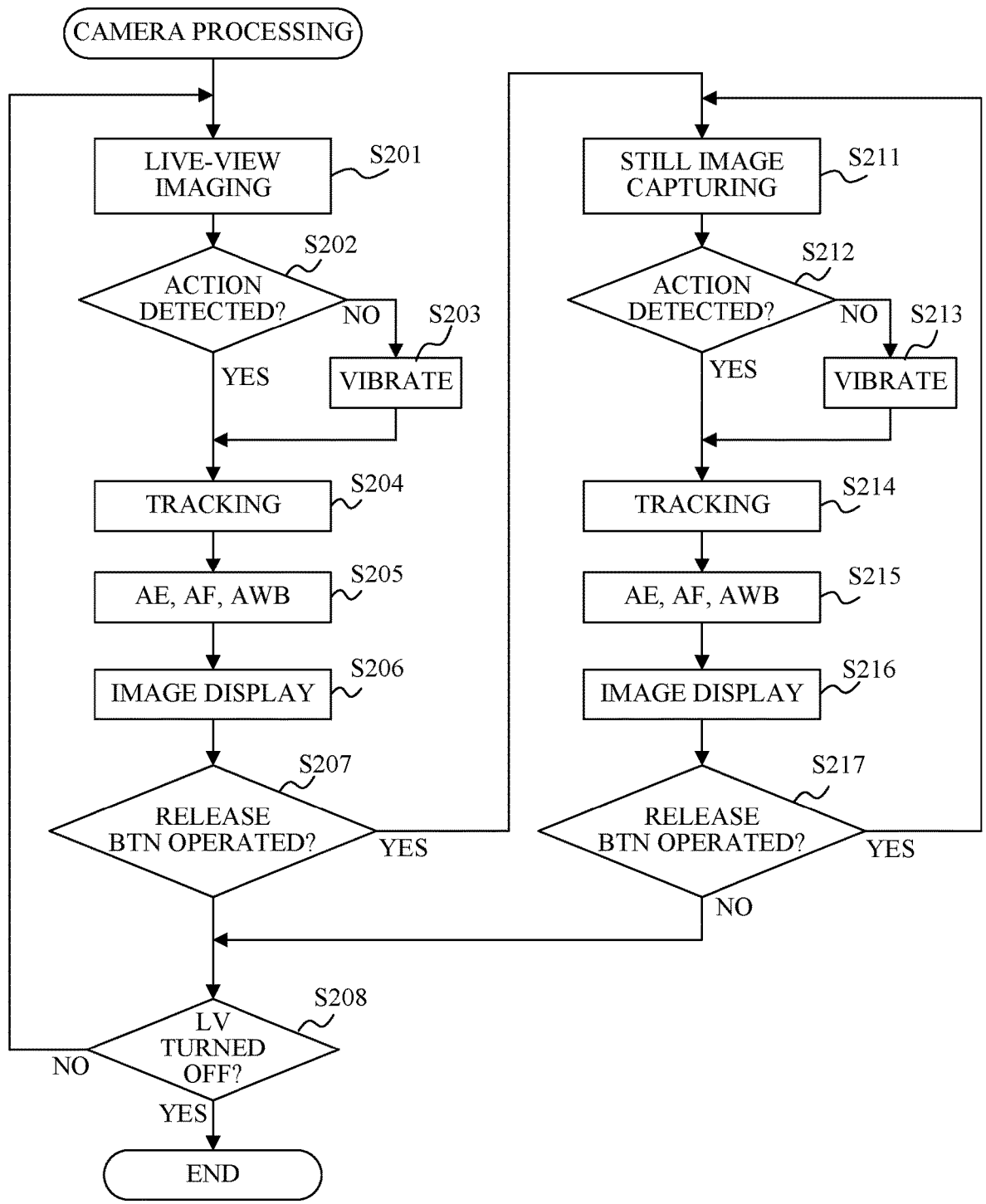
FIG. 2 is a flowchart illustrating processing according to the first embodiment.

A description will now be given of the processing (control method) that the camera control unit 30 executes according to the program. The flowchart in FIG. 2 illustrates the processing for causing the camera 20 to perform live-view display and continuous imaging. S stands for the step. The live-view display unit is an operation in which image data acquired through the image sensor 201 is displayed on the display unit 206 in real-time in order to allow the user to observe an object, perform framing, and the like. Here, the following description assumes that an imaging operation is started in a case where the user operates the release button, and that continuous imaging, which is a plurality of continuous still image captures, continues as long as the release button is continuously operated. When the vibration element 213 is instructed to start vibrating, it vibrates for a predetermined time and then stops vibrating.

In S201, the camera control unit 30 starts imaging to obtain image data (live-view image) for live-view display through the image sensor 201.

Next, in S202 (detection step), the camera control unit 30 causes the action detector 303 to detect a person who has taken a specific action among at least one person in the image data. In a case where there is a person who has taken the specific action, the tracking unit 304 selects that person as a target to be tracked, and generates tracking frame data to be superimposed and displayed on the live-view image and surrounds the person's face. Then, the processing of S203 is performed. On the other hand, in a case where no person has taken the specific action, the processing of S204 is performed.

In S203, the camera control unit 30 vibrates the vibration element 213 for a predetermined period. This causes the release button to vibrate, and the user feels the vibration. Then, the processing of S204 is performed.

In S204, the camera control unit 30 detects the object currently selected as a target to be tracked by the tracking unit 304 using the feature amount stored by the tracking unit 304. The feature amount stored by the tracking unit 304 is updated with the feature amount of the detected object, and the position of the tracking frame is updated so as to track the detected object.

Next, in S205, the camera control unit 30 performs AE (automatic exposure control), AF, and AWB for the object currently selected by the tracking unit 304 as a target to be tracked.

Next, in S206, the camera control unit 30 displays the live-view image on the display unit 206. Then, the tracking unit 304 superimposes and displays a tracking frame so as to enclose the currently selected person.

Next, in S207, the camera control unit 30 determines whether or not the release button is operated on the operation unit 212. In a case where the release button has been operated, the tracking unit 304 performs the processing in S211 assuming that the user is attempting to image the object currently selected as a target to be tracked. In a case where the release button has not yet been operated, the processing of S208 is performed.

In S208, the camera control unit 30 determines whether the live-view (LV) button on the operation unit 212 has been operated to turn off the live-view display. In a case where the live-view button has been turned off, this flow ends, and in a case where it has not been turned off, the flow returns to S201 and continues imaging for live-view display.

In S211, the camera control unit 30 captures a still image through the image sensor 201, performs the above predetermined image processing for the obtained image data, and writes the image data after the image processing into the recording medium 208.

Next, in S212, similarly to S202, the camera control unit 30 causes the action detector 303 to detect a person who has taken a specific action among at least one person in the image data. In a case where there is a person who has taken the specific action, the tracking unit 304 selects that person as a target to be tracked and generates tracking frame data to be superimposed and displayed on the live-view image during continuously imaging. Then, the processing of S213 is performed. On the other hand, in a case where there is no person who has taken the specific action, the processing of S214 is performed.

In S213, the camera control unit 30 causes the vibration element 213 to vibrate for a predetermined period, similarly to S203. Then, the processing of S214 is performed.

In S214, similarly to S204, the camera control unit 30 detects the object currently selected as a target to be tracked by the tracking unit 304 using the feature amount stored by the tracking unit 304. Then, the feature amount stored by the tracking unit 304 is updated with the feature amount of the detected object, and the position of the tracking frame is updated to track the detected object.

Next, in S215, the camera control unit 30 performs AE, AF, and AWB for the object currently selected as a target to be tracked by the tracking unit 304, similarly to S205.

Next, in S216, the camera control unit 30 displays the live-view image on the display unit 206, similarly to S206. Then, the tracking unit 304 superimposes and displays a tracking frame so as to enclose the currently selected person.

Next, in S217, the camera control unit 30 determines whether the release button is operated on the operation unit 212, similarly to S207. In a case where the release button has been operated, the flow returns to S221 and still image capturing is repeated. In a case where the release button has not yet been operated, the processing of S208 is performed.

Thus, in a case where the camera control unit 30 detects a person who takes a specific action during live-view display and continuous imaging, the camera control unit 30 causes the vibration element 213 to vibrate and notifies the user.

A description will now be given of a more specific operation of the camera control unit 30. FIGS. 4A to 4G illustrate example displayed images displayed on the display unit 206. Here, an image of a soccer (football) game is displayed.

Figure 4A:
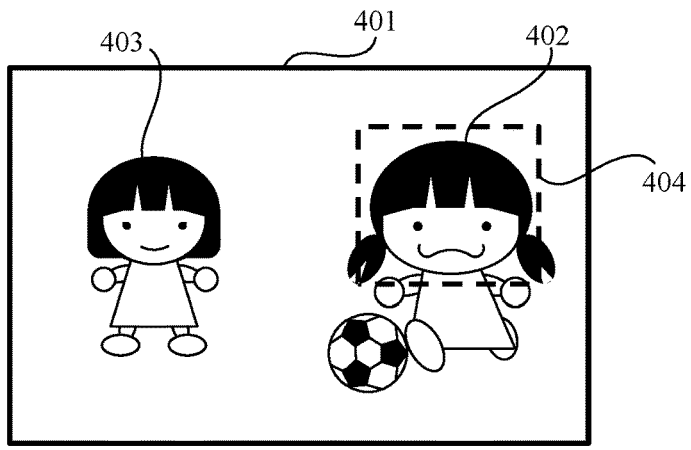
FIGS. 4A to 4G illustrate example displayed images in the first to third embodiments.

In the displayed image 401 of FIG. 4A, a person 402 as an object is taking an action relating to a soccer game, such as dribbling a soccer ball. On the other hand, a person 403 serving as another object is simply standing and is not taking any action relating to the soccer game. In this case, the person 402 is detected as an object taking a specific action by the action detector 303 and selected as a target to be tracked by the tracking unit 304, and a tracking frame 404 enclosing the face of the person 402 is displayed and superimposed. The camera control unit 30 performs AE, AF, and AWB for the person 403 in S205 of FIG. 2. No tracking frame is displayed for the person 403.

Figure 4B:
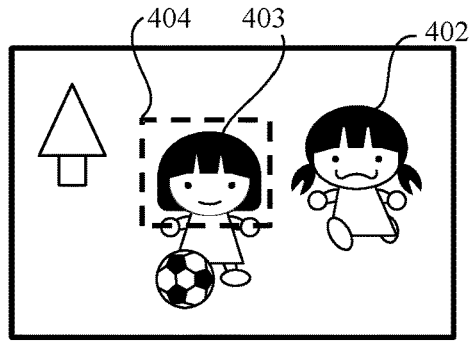
Figure 4E:
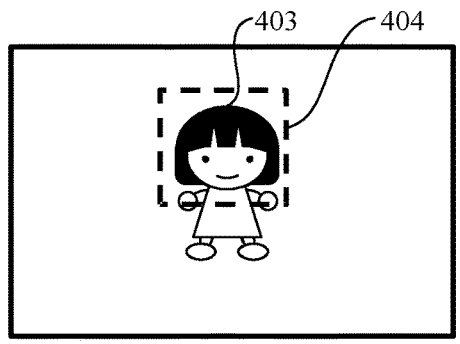
Figure 4C:
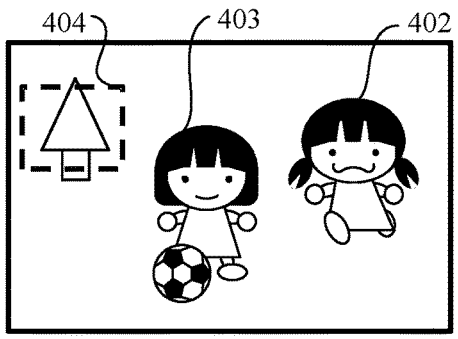
Figure 4F:
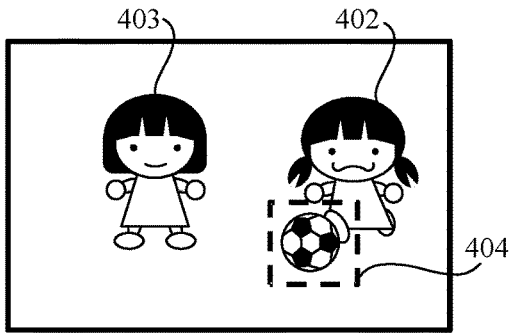
Figure 4D:
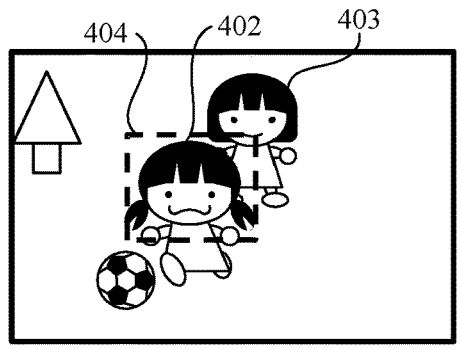

Assume that FIGS. 4B to 4D are displayed images during live-view display in which the processing of S201 to S208 in FIG. 2 is repeated. In FIG. 4B, the person 403 is taking an action relating to a soccer game, holding a soccer ball (stolen from the person 402). Therefore, the action is detected as a specific action by the action detector 303, the person 403 is selected as a target to be tracked by the tracking unit 304, and the tracking frame 404 enclosing the face of the person 403 is displayed and superimposed. Assumed that the user is aiming for imaging in this state.

Now assume that the state illustrated in FIG. 4B transitions to a state illustrated in FIG. 4C. FIG. 4C illustrates an example in which the tracking unit 304 erroneously selects an upper left tree as the person 403 as the target to be tracked and erroneously tracks the tree. As a result, the tracking frame 404 is displayed enclosing the tree. At this time, since the tracking unit 304 does not select the tree based on the detection result of the action detector 303, the vibration element 213 does not vibrate in the proceeding of S203 from S202 in FIG. 2. Due to no vibrations, the user continues to aim for imaging in the state illustrated in FIG. 4C.

Assume that the state illustrated in FIG. 4B transitions to a state illustrated in FIG. 4D. In FIG. 4D, the person 402 is taking an action relating to the soccer game, stealing the soccer ball from the person 403 again and dribbling it. This action is detected as the specific action by the action detector 303, and the person 402 is selected as a target to be tracked by the tracking unit 304. As a result, the flow proceeds from S202 to S203 in FIG. 2, where the vibration element 213 vibrates the release button. The user who feels the vibration of the release button (receives the notification) determines that this state is a state to be imaged, and operates the release button. Thereby, still image capturing in S211 of FIG. 2 is performed.

In the conventional camera, in order to distinguish between object tracking based on the action detection result and erroneous tracking, the user needs to keep watching the displayed image for the state to be imaged. On the other hand, the camera 20 according to this embodiment notifies the user by vibration that the state becomes a state to be imaged, so the user can recognize that it is in the state to be imaged without carefully viewing a displayed image. As a result, the user can image the state to be imaged without overlooking it.

Assume that FIGS. 4B to 4D illustrate displayed images during continuous imaging in which processing of S211 to S217 in FIG. 2 is repeated.

As described earlier, in FIG. 4B, the person 403 is taking an action relating to a soccer game, such as keeping a soccer ball, so the action detector 303 detects this action as the specific action, and the tracking unit 304 selects the person 403 as a target to be tracked. Then, a tracking frame 404 enclosing the face of the person 403 is displayed and superimposed. The camera control unit 30 performs AE, AF, and AWB for the person 403 in S215 of FIG. 2. The user is performing continuous imaging for the person 403.

Assume that the state illustrated in FIG. 4B transitions to a state illustrated in FIG. 4C during continuous imaging. In FIG. 4C, as described above, the tracking unit 304 incorrectly selects (erroneously detects) the upper left tree as the person 403 and the target to be tracked, and incorrectly tracks the tree. As a result, the tracking frame 404 moves to a position enclosing the tree. At this time, since the tracking unit 304 does not select the tree based on the detection result of the action detector 303, the vibration element 213 does not vibrate in the proceeding of S213 from S212 in FIG. 2. Due to no vibrations even though the tracking frame 404 has moved from the person 403 to another location, the user knows that the wrong object is about to be imaged, releases the release button, and stops continuous imaging.

Assume that the state illustrated in FIG. 4B transitions to the state illustrated in FIG. 4D during continuous imaging. In FIG. 4D, as described above, the person 402 is taking an action relating to the soccer game, stealing the soccer ball from the person 403 again and dribbling it. This action is detected as the specific action by the action detector 303, and the person 402 is selected as a target to be tracked by the tracking unit 304. Thereby, the tracking frame 404 moves from the person 403 to the person 402. The flow proceeds from S212 to S213 in FIG. 2, where the vibration element 213 vibrates the release button. In a case where the user feels the vibration of the release button, the tracking frame 404 has moved, but the user recognizes from the vibration that a new object to be imaged has been selected, and continues to operate the release button to continue the continuous imaging.

In the conventional camera, as described earlier, in order to distinguish between object tracking based on the action detection result and incorrect tracking, the user needs to keep watching the displayed image for the state to be imaged. The camera 20 according to this embodiment enables the user to recognize that the object to be imaged is being tracked continuously through vibrations without carefully viewing the displayed image. As a result, the user can continue to perform continuous imaging of the correct object without worrying about imaging of the wrong object.

As described above, this embodiment enables the user to recognize, through vibrations, whether an object to be tracked has been selected or a wrong object has been erroneously selected as a target to be tracked based on a specific action of a person, and to easily determine whether he is to start imaging or continue to continuous imaging. At this time, since the release button that instructs imaging is vibrated, the user can easily instruct the camera 20 to perform imaging.

Second Embodiment

A description will now be given of a second embodiment. In the second embodiment, the camera 20 detects and tracks a specific object to support imaging. At this time, the specific object may be a person or an object other than a person, such as an animal, a vehicle, or an object. The configuration of the camera 20 according to this embodiment is similar to that of the first embodiment.

The detector A301 detects a first object, which is a person.

The detector B302 detects a second object, which is a soccer ball. The second object detected by the detector B302 can be selected by the user through the operation unit 212. Since the soccer ball detected by the detector B302 is registered by the user before imaging, the soccer ball is set by the tracking unit 304 as a specific object to be imaged (target to be tracked), by giving priority to the soccer ball rather than the person detected by the detector A301.

Figure 3:
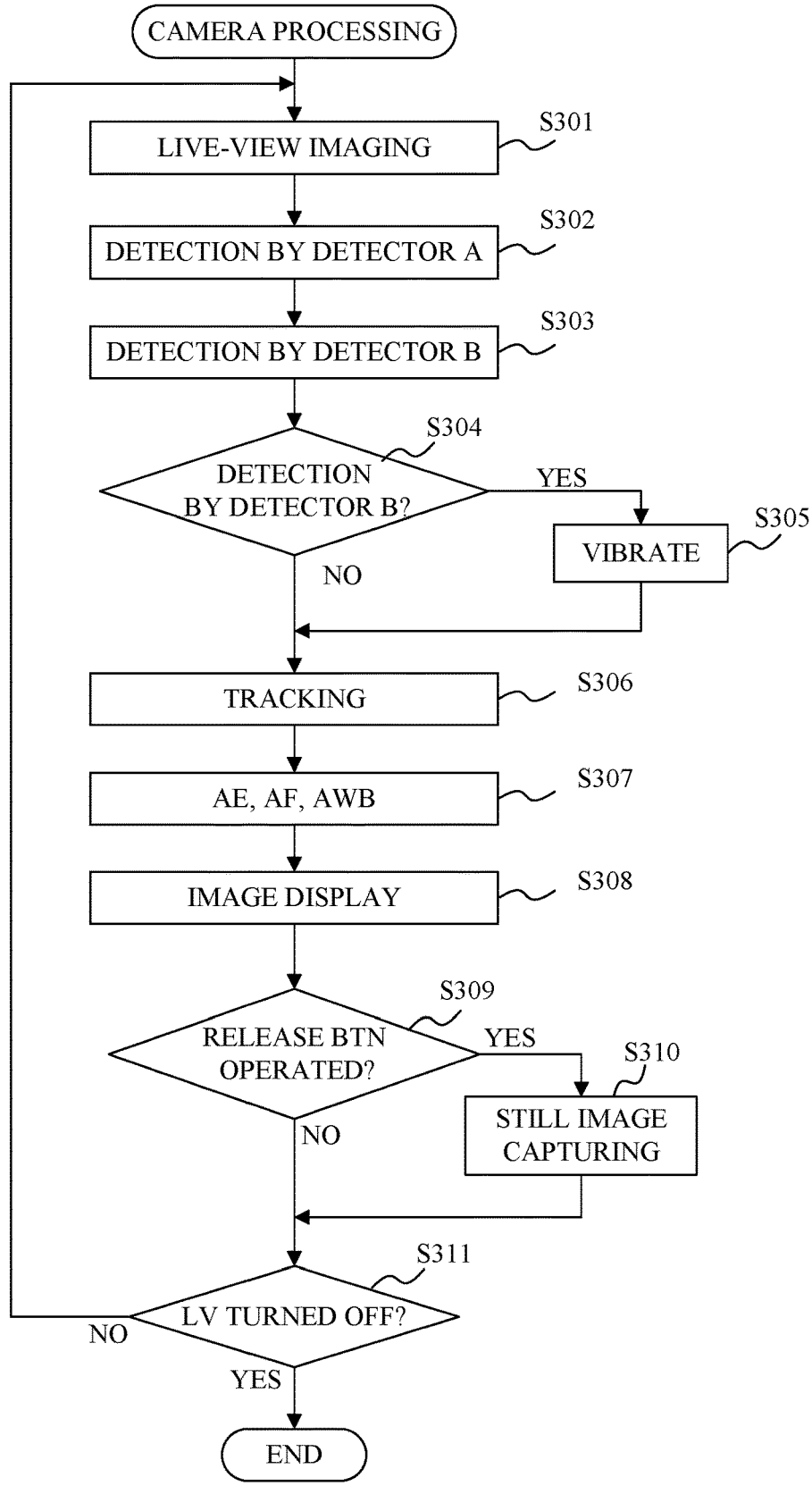
FIG. 3 is a flowchart illustrating processing according to a second embodiment.

A flowchart in FIG. 3 illustrates the processing of causing the camera 20 to perform live-view display and still image capturing.

First, in S301, the camera control unit 30 starts imaging to obtain a live-view image to be used for live-view display through the image sensor 201.

Next, in S302 (detection step), the camera control unit 30 detects a person using the detector A301. Here, in a case where a person is detected and the tracking unit 304 does not select the soccer ball, the tracking unit 304 selects the detected person.

Next, in S303 (detection step), the camera control unit 30 detects the soccer ball that has previously been set (registered) by the detector B302. In a case where the soccer ball is detected, the tracking unit 304 selects the detected soccer ball as a target to be tracked.

Next, in S304, the camera control unit 30 determines whether the soccer ball was detected in S303, and if detected, the processing of S305 is performed, and if not detected, the processing of S306 is performed.

In S305, the camera control unit 30 vibrates the vibration element 213 for a predetermined period. Thereby, the release button vibrates, and the user feels the vibration. Then, the processing of S306 is performed.

In S306, the camera control unit 30 detects the object (person or soccer ball) currently selected as a target to be tracked by the tracking unit 304 using the feature amount stored by the tracking unit 304. Then, the feature amount stored by the tracking unit 304 is updated with the feature amount of the detected object, and the position of the tracking frame is updated so as to track the detected object.

Next, in S307, the camera control unit 30 performs AE, AF, and AWB for the object currently selected as a target to be tracked by the tracking unit 304.

Next, in S308, the camera control unit 30 displays the live-view image on the display unit 206. Then, the tracking unit 304 displays a frame 404 superimposed on the currently selected person.

Next, in S309, the camera control unit 30 determines whether or not the release button is operated on the operation unit 212. In a case where the release button has been operated, the tracking unit 304 performs the processing of S310 assuming that the user is attempting to image the currently selected object. In a case where the release button is not operated, the processing of S311 is performed.

In S310, the camera control unit 30 captures a still image through the image sensor 201, performs the above predetermined image processing for the obtained image data, and writes the image data after the image processing into the recording medium 208. Then, the processing of S311 is performed.

In S311, the camera control unit 30 determines whether the live-view button on the operation unit 212 is operated to turn off live-view display. In a case where the live-view button has been turned off, this flow ends, and in a case where it has not been turned off, the flow returns to S301 and continues imaging for live-view display.

Referring now to FIGS. 4E and 4F, a description will be given of a more specific operation of the camera control unit 30 during live-view display in which the processing of S301 to S309 in FIG. 3 is repeated.

The displayed image of FIG. 4E has only the person 403. The user waits for this state to change to a state to be imaged. In this state, the detector A detects the person 403, but the detector B does not detect the soccer ball and the flow does not proceed to S305 in FIG. 3, so the vibration element 213 does not vibrate. The person 403 is selected as a target to be tracked by the tracking unit 304, and a tracking frame 404 enclosing the person 403 is displayed and superimposed.

Assume that the state illustrated in FIG. 4E transitions to a state illustrated in FIG. 4F during live-view display. FIG. 4F illustrates a displayed image in which the other person 402 has entered an imaging range while dribbling a soccer ball. At this time, since the detector B 302 detects the soccer ball, the flow proceeds from S304 to S305 in FIG. 3, where the vibration element 213 vibrates to vibrate the release button. The user who feels the vibration of the release button recognizes that the previously registered soccer ball has entered the imaging range, and operates the release button to cause the camera 20 to perform still image capturing.

The conventional camera requires the user to keep watching the displayed image to determine if the soccer ball has entered the imaging range. On the other hand, the camera 20 according to this embodiment notifies the user, through vibrations, that the soccer ball has entered the imaging range, so the user is prevented from overlooking a scene containing the soccer ball without carefully viewing the displayed image.

As described above, this embodiment enables the user to recognize, through vibrations, that a previously registered object has become in an imageable state, and to easily perform still image capturing for a scene including that object.

Third Embodiment

A description will be given of a third embodiment. In the third embodiment, the camera 20 detects a specific action of a person and tracks the person as a target to be tracked (specific object) to support imaging. The camera control unit 30 includes a vibration counter for recording parameters, and an initial value of the vibration counter is 0. The operation unit 212 has a function (FN) button different from the release button, and the vibration element 213 vibrates the FN button. The user can assign an arbitrary function to the FN button, and different functions can be assigned in a case where the vibration element 213 is not vibrating and a case where the vibration element 213 is vibrating. This embodiment assumes that once the vibration element 213 starts vibrating, it continues to vibrate for a set period until an instruction to end the vibration is given. The configuration of the camera 20 of this embodiment is similar to that of the first embodiment.

Figure 5:
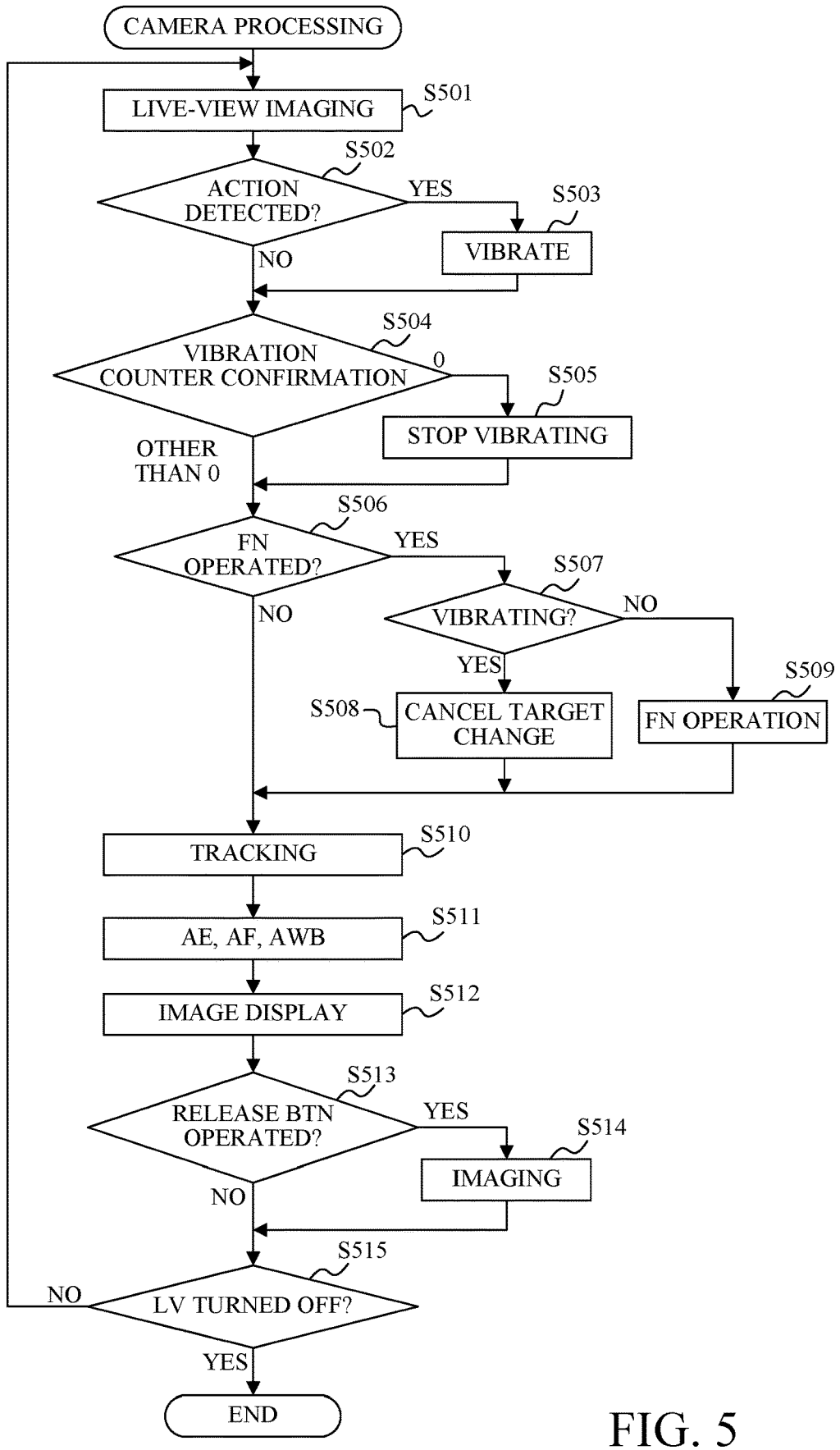
FIG. 5 is a flowchart illustrating processing according to the third embodiment.

A flowchart in FIG. 5 illustrates the processing of causing the camera 20 to perform live-view display and still image capturing in this embodiment. Now assume that there is an object that the tracking unit 304 has already selected as a target to be tracked.

In S501, the camera control unit 30 starts imaging to obtain a live-view image to be used for live-view display through the image sensor 201.

Next, in S502 (detection step), the camera control unit 30 determines whether the action detector 303 has detected a specific action of the person. In a case where the specific action is detected, the camera control unit 30 causes the tracking unit 304 to back up the object currently selected as a target to be tracked and to select as a target to be tracked a new object that has taken the specific action. Thereafter, the processing of S503 is performed. On the other hand, in a case where the specific action has not been detected, the camera control unit 30 performs the processing of S504.

In S503, the camera control unit 30 substitutes a value for the vibration counter. This value can be arbitrarily set in advance by the user through the operation unit 212. For example, in an attempt to cause the vibration element 213 to vibrate for only 2 seconds in a case where the live-view display displays 60 frames per second, substitute 60×2=120. Thereafter, the camera control unit 30 starts causing the vibration element 213 to vibrate. Then, the processing of S504 is performed.

In S504, the camera control unit 30 checks whether the value of the vibration counter is 0. In a case where the value of the vibration counter is other than 0, the vibration counter is decremented by 1 and the processing of S506 is performed. If the value of the vibration counter is 0, the processing of S505 is performed.

In S505, the camera control unit 30 stops the vibration of the vibration element 213.

In S506, the camera control unit 30 determines whether or not the FN button has been operated. In a case where the FN button has been operated, the processing of S507 is performed, and in a case where the FN button has not been operated, the process of S510 is performed.

In S507, the camera control unit 30 determines whether the value of the vibration counter is other than 0 and the vibration element 213 is currently vibrating. In a case where the vibration counter is other than 0, the processing of S508 is performed, and in a case where it is 0, the processing of S509 is performed.

In S508, the camera control unit 30 returns the object selected as a target to be tracked by the tracking unit 304 to the object backed up in S502. That is, the selection change in the target to be tracked from the object backed up in S502 is canceled (the camera control unit 30 performs an operation corresponding to the first function). The camera control unit 30 also stops the vibration of the vibration element 213. Then, the processing of S510 is performed.

In S509, the camera control unit 30 performs an operation corresponding to the second function assigned to the FN button as a function in a case where the vibration element 213 is not vibrating. For example, preview display is performed. Then, the processing of S510 is performed.

In S510, the camera control unit 30 detects the object currently selected as a target to be tracked by the tracking unit 304 using the feature amount stored by the tracking unit 304. Then, the camera control unit 30 updates the feature amount stored by the tracking unit 304 with the feature amount of the detected object, and updates the position of the tracking frame so as to track the detected object.

Next, in S511, the camera control unit 30 performs AE, AF, and AWB for the object currently selected as a target to be tracked by the tracking unit 304.

Next, in S512, the camera control unit 30 displays the live-view image on the display unit 206. Then, the tracking unit 304 displays and superimposes a tracking frame so as to enclose the currently selected object.

Next, in S513, the camera control unit 30 determines whether the release button has been operated on the operation unit 212. In a case where the release button has been operated, the processing of S514 is performed, and in a case where the release button has not been operated, the processing of S515 is performed.

In S514, the camera control unit 30 performs still image capturing through the image sensor 201, the above predetermined image processing for the obtained image data, and writes the image data after the image processing into the recording medium 208. Then, the processing of S515 is performed.

In S515, the camera control unit 30 determines whether the live-view button on the operation unit 212 has been operated to turn off the live-view display. In a case where the live-view button has been turned off, this flow ends, and in a case where it has not been turned off, the flow returns to step S501 and continues imaging for live-view display.

Figure 4G:
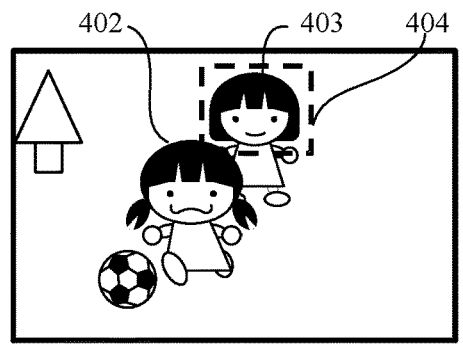

Referring now to FIGS. 4B, 4D, and 4G, a description will be given of a more specific operation of the camera control unit 30 during live-view display in which the processing of S501 to S515 in FIG. 5 is repeated.

In FIG. 4B, as described in the first embodiment, the person 403 is taking an action relating to a soccer game, such as keeping a soccer ball. This action is detected by the action detector 303, the person 403 is selected as a target to be tracked by the tracking unit 304, and a tracking frame 404 enclosing the face of the person 403 is displayed and superimposed. Assume that the user is aiming for imaging in this state.

Assume that the state illustrated in FIG. 4B transitions to the state illustrated in FIG. 4D during live-view display. In FIG. 4D, as described in the first embodiment, the person 402 is taking an action relating to the soccer game, stealing the soccer ball from the person 403 again and dribbling it. This action is detected as the specific action by the action detector 303, and the person 402 is selected as a target to be tracked by the tracking unit 304. As a result, the flow proceeds from S502 to S503 in FIG. 5, where the vibration element 213 vibrates the FN button. The user who feels the vibration of the FN button recognizes that the target to be tracked has shifted from the person 403 to the person 402. At this time, the displayed tracking frame 404 also moves from a position enclosing the person 403 to a position enclosing the person 402.

The user may continue to operate the release button to instruct still image capturing of the person 402. A case where the user wishes to continue imaging the person 403, that is, a case where the detection result of the action detector 303 is different from the user's intention will be described below.

In this case, a change from the person 403 to the person 402 to be tracked is canceled by the user operating the FN button, which continues to vibrate for two seconds after the vibration starts. That is, the tracking unit 304 selects the person 403 again as a target to be tracked. As a result, the tracking frame 404 is redisplayed at a position enclosing the person 403, as illustrated in FIG. 4G.

Once a new object that has taken a specific action is detected and a target to be tracked changes to that new object, the conventional camera cannot cancel the change with a simple operation. In contrast, the camera 20 according to this embodiment enables the user to easily recognize that the target to be tracked has changed due to the vibration of the FN button, and to cancel the change in the target to be tracked by a simple and intuitive operation of the vibrating operation member.

As described above, this embodiment enables the user to recognize that the target to be tracked has changed to an object that has taken a specific action without carefully viewing the displayed image. At this time, since the FN button vibrates, this embodiment can clearly notify the user that the change in the target to be tracked can be canceled by operating the FN button. By assigning the function of canceling the change in the target to be tracked only to the FN button that is vibrating, another function can be assigned to the FN button that is not vibrating. That is, a plurality of functions can be assigned to a single FN button.

Fourth Embodiment

A description will be given of a fourth embodiment as a variation of the first to third embodiments.

The first to third embodiments vibrate the vibration element 213 in a case where a specific object is detected (selected), and do not vibrate the vibration element 213 in a case where the specific object is not detected (including erroneous detection). The case where the control of the vibration element 213 is changed has been described. On the other hand, the control of the vibration element 213 may be changed so that in a case where a specific object is detected, the vibration element 213 is caused to generate first vibration, and in a case where a specific object is not detected, the vibration element 213 is caused to generate second vibration different from the first vibration. For example, the first vibration may be a high-frequency vibration and the second vibration may be a low-frequency vibration, or the first vibration may be a high-amplitude vibration and the second vibration may be a low-amplitude vibration.

In the first to third embodiments, the single vibration element 213 vibrates the release button or the FN button. On the other hand, by providing two vibration elements, for example, on the right and left sides of the camera 20, and by vibrating the vibration element corresponding to the moving direction of the tracking frame 404, the user can be notified of the moving direction of the tracking frame. More specifically, in a case where the tracking frame 404 located near the center in FIG. 4B moves to the left as in FIG. 4C, the vibration element on the left side is vibrated. In a case where the tracking frame 404 located near the center in FIG. 4B moves to the right as in FIG. 4A, the vibration element on the right side is vibrated. The moving direction of the tracking frame may be notified by sequentially vibrating rightward or leftward a plurality of vibration elements arranged in the left-right direction of the camera 20, or by vibrating a single vibration element that extends in the left-right direction so that the vibration propagates rightward or leftward.

The third embodiment enables the user to cancel a change in a target to be tracked by operating the FN button only while the vibration element 213 is vibrating, and enables another function to be assigned to the FN button while the vibration element 213 is not vibrating. However, the third embodiment can also allocate only the function of canceling a change in a target to be tracked to the FN button so that the function becomes effective only during vibration. The function assigned to the vibrating FN button may be other than the function of canceling the change in the target to be tracked. For example, the function assigned to the vibrating FN button may be a function that instructs the user to change the target to be tracked.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions. For example, each embodiment is applicable to a control apparatus for an image pickup apparatus that is configured to generate image data by imaging and includes a vibrator configured to generate vibration recognizable by a user. The control apparatus includes a memory storing instructions, and a processor configured to execute the instructions to detect a specific object in the image data, select the specific object as a target for processing relating to the imaging, and control a vibrator according to a detection result.

Each embodiment notifies a user of object detection using vibration.

This application claims priority to Japanese Patent Application No. 2023-098239, which was filed on Jun. 15, 2023, and which is hereby incorporated by reference herein in its entirety.

What is claimed is:

1. An image pickup apparatus configured to generate image data by imaging, the image pickup apparatus comprising:
a vibrator configured to generate vibration recognizable by a user; and
a processor configured to:
detect a specific object in the image data,
select the specific object as a target for processing relating to the imaging;
control the vibrator according to a detection result;
change control of the vibrator between a case where the specific object is detected and a case where the specific object is not detected;
cause the vibrator to vibrate in a case where the specific object is detected; and
cause the vibrator not to vibrate in a case where the specific object is not detected.

2. The image pickup apparatus according to claim 1, wherein the case where the specific object is not detected includes a case where the specific object is erroneously detected.

3. The image pickup apparatus according to claim 1, wherein the processor is configured to:
cause the vibrator to generate first vibration in a case where the specific object is detected, and
cause the vibrator to generate second vibration different from the first vibration in a case where the specific object is not detected.

4. The image pickup apparatus according to claim 1, wherein the processor is configured to detect an object that has taken a specific action as the specific object.

5. The image pickup apparatus according to claim 1, wherein the processor is configured to detect a previously registered object as the specific object.

6. The image pickup apparatus according to claim 1, wherein the processing includes at least one of tracking of the specific object, auto-exposure control, autofocus, and auto-white balance control.

7. The image pickup apparatus according to claim 1, further comprising an operation member operable by a user, wherein the vibrator vibrates the operation member.

8. The image pickup apparatus according to claim 1, wherein the operation member is an operation member configured to instruct the imaging.

9. The image pickup apparatus according to claim 1, wherein the operation member is an operation member to which a function other than instructing the imaging is assigned.

10. The image pickup apparatus according to claim 9, wherein an operation corresponding to a first function assigned to the operation member is performed according to an operation of the operation member while the vibrator is vibrating.

11. The image pickup apparatus according to claim 10, wherein the first function is a function of canceling or instructing the processor to change a selection of the specific object.

12. The image pickup apparatus according to claim 10, wherein the operation corresponding to the first function is performed according to the operation of the operating member while the vibrator is vibrating, and an operation corresponding to a second function different from the first function is performed according to the operation of the operating member while the vibrator is not vibrating.

13. The image pickup apparatus according to claim 1, wherein in a case where a selected specific object is changed, the processor is configured to cause the vibrator to generate the vibration indicating a change direction.

14. A method of controlling an image pickup apparatus that is configured to generate image data by imaging and includes a vibrator configured to generate vibration recognizable by a user, the method comprising the steps of:
detecting a specific object in the image data;

selecting the specific object as a target for processing relating to the imaging; and controlling the vibrator according to a detection result in the detecting step;

changing control of the vibrator between a case where the specific object is detected and a case where the specific object is not detected;

causing the vibrator to vibrate in a case where the specific object is detected; and causing the vibrator not to vibrate in a case where the specific object is not detected.

15. A non-transitory computer-readable storage medium storing a program that causes a computer of the image pickup apparatus to execute the control method according to claim 14.

16. A control apparatus for an image pickup apparatus that is configured to generate image data by imaging and includes a vibrator configured to generate vibration recognizable by a user, the control apparatus comprising:

a memory storing instructions; and a processor configured to execute the instructions to:
  detect a specific object in the image data,
  select the specific object as a target for processing relating to the imaging, and
  control a vibrator according to a detection result;
  change control of the vibrator between a case where the specific object is detected and a case where the specific object is not detected;
  cause the vibrator to vibrate in a case where the specific object is detected; and
  cause the vibrator not to vibrate in a case where the specific object is not detected.

* * * * *